(12) United States Patent  (10) Patent No.: US 7,886,146 B2
Fascenda et al.  (45) Date of Patent: Feb. 8, 2011

(54) NETWORK CRYPTOGRAPHY SYSTEM AND METHOD

(75) Inventors: Anthony C. Fascenda, North Bethesda, MD (US); James Gibbons, San Jose, CA (US)

(73) Assignee: Koolspan, Inc., Bethesda, MD (US)

( * ) Notice: Subject to any disclaimer, the term of this patent is extended or adjusted under 35 U.S.C. 154(b) by 999 days.

(21) Appl. No.: 11/724,153

(22) Filed: Mar. 15, 2007

(65) Prior Publication Data

US 2008/0052511 A1  Feb. 28, 2008

Related U.S. Application Data

(60) Provisional application No. 60/782,273, filed on Mar. 15, 2006.

(51) Int. Cl.
  *H04L 29/06*  (2006.01)
(52) U.S. Cl. .......................... 713/160; 713/150; 380/28

(58) Field of Classification Search .................. 713/160
  See application file for complete search history.

(56) References Cited

U.S. PATENT DOCUMENTS

| 6,032,197 | A  | * | 2/2000 | Birdwell et al. ............. 709/247 |
| 6,249,582 | B1 |   | 6/2001 | Gilley |
| 6,909,702 | B2 | * | 6/2005 | Leung et al. ................ 370/278 |
| 7,055,039 | B2 |   | 5/2006 | Chavanne et al. |

OTHER PUBLICATIONS

International Search Report mailed Mar. 19, 2008.

* cited by examiner

*Primary Examiner*—Kimyen Vu
*Assistant Examiner*—Yogesh Paliwal
(74) *Attorney, Agent, or Firm*—Hunton & Williams LLP

(57) ABSTRACT

A system for and method of providing encrypted network communications is presented. The system and method involve creating encrypted frames used for secure communications between cooperating peers that are the same size as the original unencrypted frames. The system and method thus provide secure communications with essentially the same transmission characteristics as non-encrypted communications.

2 Claims, 8 Drawing Sheets

NETWORK CRYPTOGRAPHY SYSTEM AND METHOD

RELATED APPLICATIONS

The present application claims priority to U.S. Provisional Patent Application No. 60/782,273 entitled "System and Method of Network Cryptography" filed Mar. 15, 2006.

FIELD OF THE INVENTION

The present invention relates to a system and method of network cryptography.

SUMMARY OF THE INVENTION

Embodiments of the present invention may be used to generate encrypted data communication frames that have the same size as the original unencrypted frames. That is, each frame that is to be communicated may be encrypted without increasing its size, yielding exactly one encrypted frame the same size as the original frame. By way of non-limiting example, such frames may be 1,514 bytes in size, which is standard for IEEE 802.3 (Ethernet) networks (not including the frame preamble or cyclic redundancy check). Ordinarily, encrypting frames according to prior art techniques will increase the size of the frame due to encryption overhead information. The increased size of the encrypted frame may no longer fit across the desired communications path, thus requiring it to be fragmented into two or more frames. It is a well understood problem that such fragmentation causes adverse affects along the path as well as between the communicating nodes. For instance due to frame fragmentation, more data is sent, resulting in reduced speed, an increase in bandwidth consumption, etc. Furthermore, even if the increased-sized frame does fit across the data communications network interconnects, the additional overhead adds extra latency (e.g. more bits to send and receive), potentially causing a degradation in the quality of the communications. Additional resources may also be consumed such as computer memory or other computational resources needed to handle the multiple fragments or increased overhead. Certain embodiments of the present invention avoid these and other drawbacks of the prior art.

Embodiments of the present invention may be used in the context of Voice Over Internet Protocol, regular internet or other network communications, Virtual Private Networks, or any other packetized communication.

Header compression of the present invention may reduce the amount of data sent between entities using, by way of non-limiting example, the KoolSpan Encryption Protocol ("KEP"). It may operate by establishing header context records that maintain data much of which is redundant between frames. Subsequent frame headers can be compressed by sending only header data that differs from established context data. The context data may include standard protocol headers, which KEP normally encrypts, as well as, by way of non-limiting example, the KoolSpan Protocol ("KP") and KEP headers. This reduction in existing header size allows for additional encryption overhead to be added, thus maintaining or even reducing the size of the original frame.

There are at least two main benefits of header compression. First, it avoids fragmentation of frames for a given communication medium. Second, it reduces bandwidth requirements.

During the transmission process, additional header information may be added for secure communication over local networks such as KEP, and additionally in remote sessions, Internet protocol ("IP") headers to allow for successful routing of frames over network paths. Due to the addition of these headers, the resultant frame exceeds the communication's path maximum transmission unit ("MTU"), causing the frame to be transmitted in fragments. In accordance with some embodiments of the present invention, header compression may result in no expansion of the frame (i.e. zero overhead). It may often avoid the fragmentation that can occur with KEP and other communication protocols.

In some instances, the bandwidth reduction realized using header compression can be relatively small per frame when considering it as a percentage of the overall frame size, if the original frame is large. However, with regards to bandwidth consumption, header compression may have its greatest effect when frames are small. As such, header compression may be particularly effective for systems having slow transmission rates or other severe bandwidth constraints.

Header compression may operate within a context. Certain protocol header fields may distinguish contexts within each header compression category. These may be fields such as IP addresses and Transmission Control Protocol ("TCP") or User Datagram Protocol ("UDP") ports. The values of these fields may be static within their context.

An initiator and a collaborator may comprise the two entities that participate in header compression. The initiator may monitor the traffic passing through it to determine which contexts would benefit from header compression. When it finds a candidate, it may assign a unique identifier and attempt to initiate header compression in that context with its collaborator. The collaborator may accept or refuse to initiate header compression.

Header compression contexts may comprise only traffic between two cooperating entities. It also may replace the KEP header information with a modified format such as the KoolSpan Encryption Protocol/Header Compression ("KEP/HC") header.

BRIEF DESCRIPTION OF THE DRAWINGS

The novel features that are considered characteristic of the invention are set forth with particularity in the appended claims. The invention itself, however, both as to its structure and operation together with the additional objects and advantages thereof are best understood through the following description of exemplary embodiments of the present invention when read in conjunction with the accompanying drawings.

DETAILED DESCRIPTION OF THE INVENTION

In general, Ethernet network communication allows for the transmission of data frames across a network that do not exceed 1,514 bytes in size. Given that encryption generally requires increased overhead in the form of additional headers such that the entire packet exceeds 1,514 bytes, header compression may be used to decrease the encryption overhead of Ethernet frames of the present invention to meet the 1,514 byte size limit.

Figure 1:
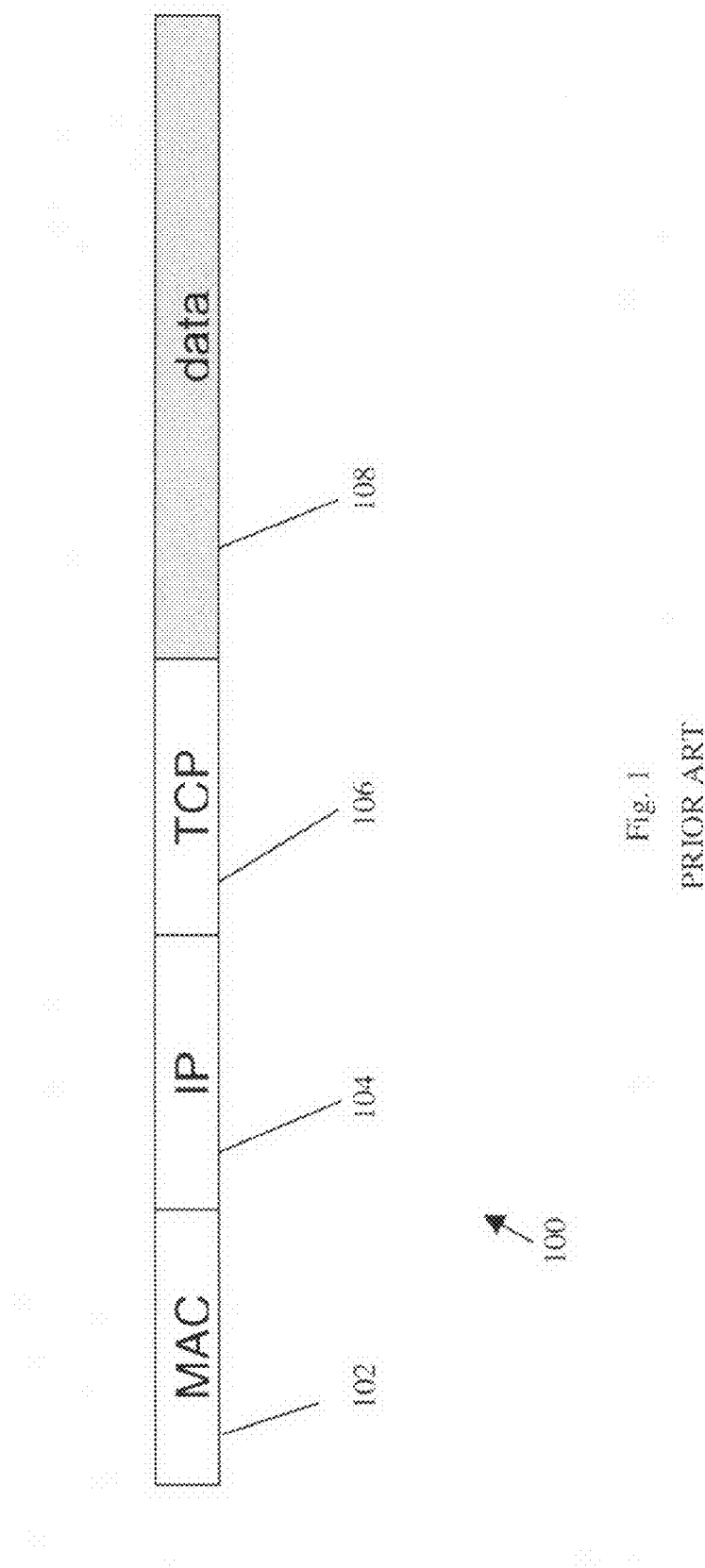
FIG. 1 is a schematic diagram depicting an original Ethernet frame of the prior art.

FIG. 1 is a schematic diagram depicting a prior art Ethernet frame 100. Frame 100 consists of several parts. First, MAC portion 102 contains a Media Access Control ("MAC") header which comprises 14 bytes. The MAC header 102 typically contains two address fields comprising a source address and a destination address, among other information fields. Specifically, the source address may indicate the network adaptor the datagram originated from while the destination address may indicate the network adaptor the datagram is traveling to. Second, if the Ethernet frame is of the type used by the standard Internet Protocol, IP portion 104 contains an Internet Protocol ("IP") header which comprises 20 bytes. The IP header 104 contains several information fields, including the source and destination network identifiers (e.g. addresses). Specifically, the IP header 104 may contain a source address that is assigned to the particular network layer interface where the IP datagram originated and a destination address that is assigned to the particular network layer interface where the IP datagram is traveling to. Third, TCP portion 106 contains a Transmission Control Protocol ("TCP") header which comprises 20 bytes. The TCP header 106 also contains several information fields, including the source and destination communication end-point identifiers (e.g. port numbers). Finally, data portion 108 contains the data payload of the IP datagram. Due to the byte-size limit on frames that may be transmitted over an Ethernet, all the portions of the original Ethernet frame 100 combined can not exceed a fixed limit, by way of non-limiting example 1,514 bytes.

In order to ensure that the data transmitted across the Ethernet from a remote point is not compromised during transmission, protocols of the present invention such as KoolSpan Protocol ("KP"), KoolSpan Encryption Protocol ("KEP"), KoolSpan Authorization Protocol ("KAP"), and the like, encapsulate the data during transmission. Each protocol of the present invention may contribute additional header information comprising additional bytes to the Ethernet frame.

It should be noted that FIGS. 2-8 depict an example of the present invention using TCP as the type of transport layer protocol over an Ethernet network. It would be known to one of ordinary skill in the art that other protocols such as User Datagram Protocol ("UDP"), Real-time Transport Protocol ("RTP") and the like may also be used in conjunction with the present invention for communications.

Figure 2:
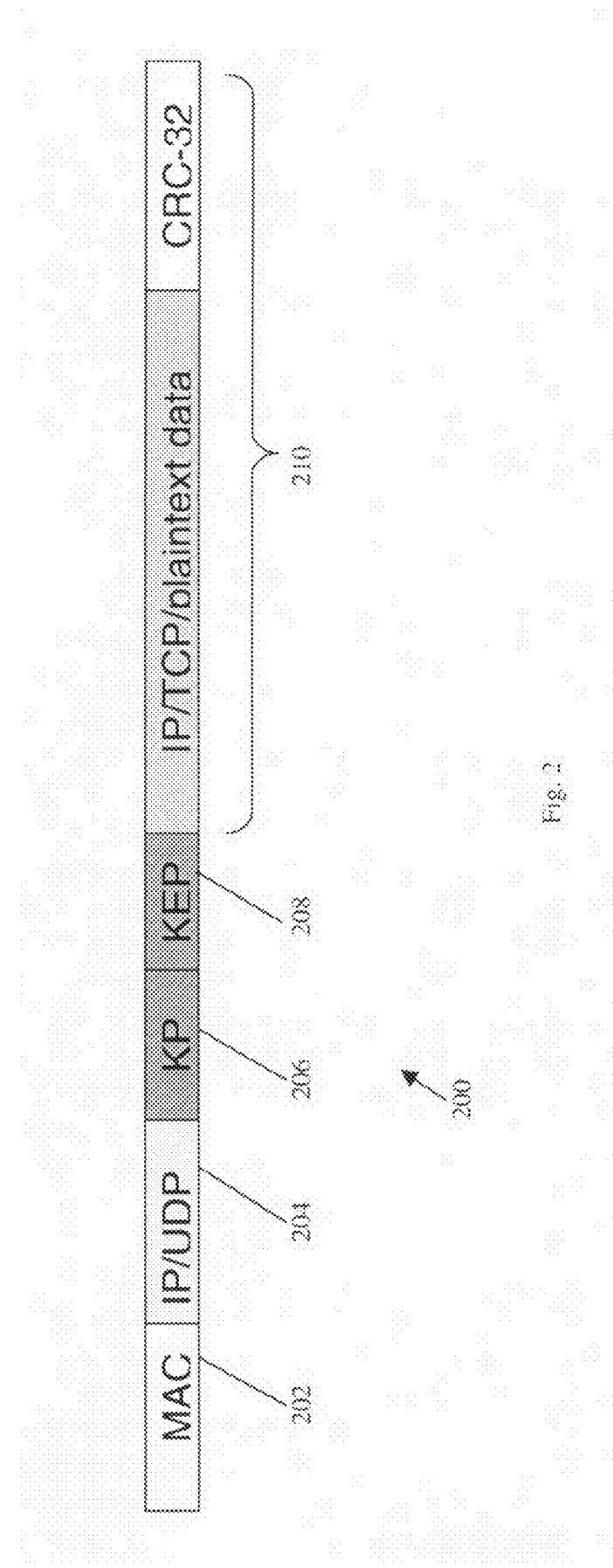
FIG. 2 is a schematic diagram depicting an Ethernet frame without header compression according to an embodiment of the present invention.

FIG. 2 is a schematic diagram depicting an Ethernet frame without header compression 200 according to one embodiment of the present invention. Frame 200 consists of several parts. Portion 202 contains MAC header 202 that may be similar to the MAC header 102 described in FIG. 1. Accordingly, MAC header 202 may also comprise 14 bytes. IP/UDP portion 204 contains the Internet Protocol/User Datagram Protocol ("IP/UDP") header. The IP/UDP portion 204 may be used to encapsulate ciphertext of the original frame (e.g., the encrypted plain text) into an UDP datagram. The IP portion of the IP/UDP header 204 may be similar to the IP header 104 described in FIG. 1. Accordingly, the IP portion of IP/UDP 204 may also comprise 20 bytes. The UDP portion of the IP/UDP header 204 may comprise 8 bytes. The UDP portion of the IP/UDP header 204 may contain several information fields, including the source and destination communication end point identifiers (e.g., port numbers), the length of the UDP header and the data encapsulated and a checksum.

According to this embodiment, the KP and KEP protocols may be used to encapsulate data for encryption purposes. KP portion 206 contains the KP header. The KP may encapsulate other KoolSpan protocols. According to one embodiment of the present invention, the KP header 206 may comprise 12 bytes. According to another embodiment of the present invention, the KP header 206 may not be configured to have header compression enabled. The KP header 206 without header compression enabled may contain a version field comprising 1 byte, a type field comprising 1 byte, a length field comprising 2 bytes, a sequence field comprising 4 bytes, a flags field comprising 1 byte and a reserved for future use ("rfu") field comprising 3 bytes. The KP header 206 type field may comprise a signal to indicate which KP protocol is being used for encryption. The type signal may comprise a KAP signal, a KEP signal, a KCD signal, or the like. For example, a KAP type signal may indicate that the KAP protocol is being used, a KEP type signal may indicate that the KEP protocol is being used, while a KCD type signal may indicate that the KCD protocol is being used. The KP header 106 flags field may comprise a signal to indicate whether the frame is fragmented or unfragmented. For example, a flags field of a fragmented datagram may contain a fragmented signal, while a flags field of an unfragmented datagram may contain an unfragmented signal.

KEP portion 208 contains the KEP header. According to one embodiment of the present invention, the KEP header 208 may comprise 16 bytes. The KEP header 208 may contain an encVersion field comprising 1 byte, a flags field comprising 1 byte, a destination address field comprising 6 bytes, a source address field comprising 6 bytes and an Ethernet type field comprising 2 bytes. The KEP header 208 encVersion field may comprise a signal to indicate which version of the KEP protocol is being used for encryption. The KEP header 208 flags field may comprise a signal to indicate the type of communications that will be taking place over the Ethernet comprising a data signal, a broadcast signal, a keep alive signal, or the like. For example, a data flag signal may indicate that the type of communication to be transmitted is data communication, a broadcast flag signal may indicate that the type of communication to be transmitted is broadcast communication, while a keep alive flag signal may indicate that the type of communication to be transmitted is keep alive communication. The KEP header 208 destination address and source address fields may comprise destination and source address that are equivalent to the destination and source addresses in the MAC header 202. The KEP header 208 Ethernet type field may comprise a signal to indicate the type of traffic that will flow over the Ethernet. The KEP header 208

Ethernet type field may comprise an Ethernet type signal that is equivalent to the Ethernet type signal in the MAC header 202.

IP/TCP/Plaintext code portion 210 contains the data payload of a datagram. According to one embodiment of the present invention, a 32-bit cyclical redundancy code ("CRC-32") may comprise 4 bytes and be added to the IP/TCP/Plaintext data portion 210. According to one embodiment, IP/TCP/Plaintext data with a 32-bit cyclical redundancy code portion 210 may be encrypted using a KEP or the like. According to another embodiment, another tamper evidence check other than CRC-32 may be added to IP/TCP/Plaintext data. According to yet another embodiment, IP/TCP/Plaintext data may not have a tamper evidence check.

By encrypting datagrams with the use of encrypting techniques of certain embodiments of the present invention, the portions of the Ethernet frame without header compression 200, all together, may combine to contribute an additional 60 bytes to the portions of the original Ethernet frame of the prior art. The additional 60 bytes may increase the total byte size of a datagram of the present invention to 1,574 bytes. As previously discussed, Ethernet communication allows for the transmission of frames across the network that do not exceed 1,514 bytes in size. In this case, the frame may need to be fragmented to decrease the byte size of the resultant frames being transmitted across the Ethernet. Fragmentation, however, increases the overall processing time which may significantly decrease the speed in which data may be transmitted across the Ethernet.

A header compression technique of the present invention may be used to decrease the byte size of a datagram frame 200 to be transmitted over the Ethernet to reduce the size of the resultant frame to be less than or equal to the 1,514 byte size limit.

The header compression technique according to certain embodiments of the present invention may comprise taking data that generally will not change for a given service, creating a service record, and forwarding that data to a corresponding entity such as a Koolspan lock. A service record may comprise any given communication session between cooperating entities across a network path. A lock may comprise at least one network interface and a ciphering engine that is used to decrypt encrypted frames at the receiving end of the communication path. A lock may act as a remote bridge that bridges two Ethernet networks across a communications path. The lock may store this context data against a service number. If additional data is sent to the lock referencing the service number, the lock may reinsert the static, non-changing data back into the decrypted datagram restoring the frame to its original state.

An entity may monitor its incoming traffic for every established session. If it fails to receive any valid KEP traffic from another entity for a certain period of time then it may discard its session with that entity. KEP defines a special frame type called a keep-alive that an entity may send periodically if it has no other traffic to send. Doing so may avoid its session partner's KEP timeout.

KEP/HC defines another use for keep-alive datagrams. If an entity needs to send a header compression signal, and it has no other traffic to which it can attach that signal, it may send the signal within a keep-alive datagram.

In some embodiments, not all signals may be communicated in keep-alive datagrams. Keep-alive datagrams are out-of-band communications that may not be in any header compression context. Thus, a keep-alive datagram may not carry the signal(s) needed to convey context data. Most such signals may accompany a communicated frame that is within the context. Such frames may implicitly impart context data.

The INIT_OUT signal, described below, may be an exception to the restriction on conveying context data with a keep-alive. Since the context is outgoing, there may be no incoming traffic to implicitly carry the context data. In this situation, the initiator may use a keep-alive datagram. The context data may be in its encrypted content.

To enable configuration of the header compression functionality, some embodiments of the invention provide a new parameter setting at the cooperating peers. For instance, a header compression setting may be set to zero (0) to disable header compression. It may be set to one (1) to enable header compression. It may be set to two (2) to enable header compression to be negotiated based on the peer's configuration. Note that header compression may occur if both the lock and the other entity have it enabled and if the communication contexts between them are amenable to header compression. Other values of configuration methodologies may also be used.

The KEP/HC protocol may consist of three parts. The first part may specify the context data shared between an initiator and a collaborator. The second part may define a group of compressed headers. The third part may describe the procedures for managing context data using header compression signals.

There may be different categories of header compression. For instance three such categories may be TCP, RTP, and UDP. A context's category may determine the content of its context data and the type of compressed header it uses.

The TCP category may cover TCP connections carried between entities. The headers it compresses may be KP, KEP, IP, and TCP. It may be a bidirectional context, so its context data may comprise both incoming and outgoing headers.

The RTP category may cover IP/UDP encapsulated RTP sessions carried between entities. The headers it compresses may be KP, KEP, IP, UDP, and RTP. It may be a unidirectional context that can work in either direction. Its context data may comprise either incoming or outgoing headers.

The UDP category may cover IP/UDP datagrams carried between entities that do not contain RTP. The headers it compresses may be KP, KEP, IP, and UDP. This category may not be as effective as the others; it may compress to a small, but non-zero, amount of overhead. It may be a unidirectional context that can work in either direction. Its context data may comprise either incoming or outgoing headers.

Each header compression category may use a different context data. The header fields within that data may be of five general types listed below. A header field's compression type may depend on four attributes. The first may be whether its value changes from one frame to the next, within a context, or remains constant. For an unvarying field, the second attribute may its necessity for defining the context. If the field's value does change, however, then the third attribute may be the frequency of changes. The fourth attribute, if a field's value changes frequently, may be the method used to communicate its value.

The five general types of context data may comprise defined, implied, derived, encoded and carried. Defined may refer to header fields that define a particular context. Their values may not change because a different value defines a different context. The communicating entities may establish the value of this type of field in their context data when they initiate the context. Implied may refer to header fields that change infrequently, if at all. Such fields may not be necessary for defining a context. The communicating entities may establish the value of this type of field in their context data when they initiate the context. If these values change then the entities may update their context data. Derived may refer to header fields that have values that change frequently, but the receiving entity can compute their values from other known data. Length fields may be an example of this type. Encoded may refer to header fields that have frequently changing values, but the transmitting entity can encode their values in ways that require fewer bits. The encoding methods used may depend on the particular fields and how their values change. Carried may refer to header fields that have values that change frequently, but there is no way to encode their values in fewer bits. The transmitting entity may send their values in their entirety.

The defined, implied, and derived header field types may allow the most compression. They may require no space in the compressed header. The encoded type may need compressed header space but still may allow some compression. The carried type may allow no compression.

In the tables that follow, the typeface of the field names distinguishes their types. Those named in boldface define the context (DEFINED). Those in regular typeface may not contribute to the content of the compressed header (IMPLIED or DERIVED). Those in italics do contribute to the content of the compressed header (ENCODED or CARRIED).

The context data in the TCP header compression category may contain two sets of headers. One set may be for the outgoing part of the connection. The other may be for the incoming part. The outgoing context data for one entity may correspond to the incoming data for the other entity using that context.

Each set within the TCP context data may store a copy of the KP, KEP, IP, and TCP headers used for traffic in a particular direction. This set of headers appears in the following table.

The following table may characterize the header fields for the TCP header compression category. Note that some header fields may have constraints. If any header field fails to meet its constraint, then the frame may be unsuitable for header compression.

TABLE 2

Header Fields for the TCP Category

| Field Name | Type | Additional Information |
| --- | --- | --- |
| kpVersion | IMPLIED | Constraint: a version that supports header compression. |
| kpType | IMPLIED | |
| kpLength | DERIVED | |
| kpSequence | ENCODED | Encoding: LSB modified (5 bits). |
| FRG (kp) | IMPLIED | |
| kpHcSignal | ignored | Special: Stored in context data as zero. |
| kepVersion | IMPLIED | |
| K (kep) | IMPLIED | |
| B (kep) | IMPLIED | |
| kepBID | IMPLIED | |
| kepDestAddress | IMPLIED | |
| kepSrcAddress | IMPLIED | |
| kepEthType | IMPLIED | |
| ipVer | IMPLIED | |
| ipIHL | IMPLIED | |
| ipDSCP | IMPLIED | |
| ECN (ip) | IMPLIED | |
| ipTotalLength | DERIVED | |

TABLE 1

Headers for TCP Category
Headers for TCP Category

```
+-+-+-+-+-+-+-+-+-+-+-+-+-+-+-+-+-+-+-+-+-+-+-+-+-+-+-+-+-+-+-+-+--
|0|    kpVersion     |       kpType       |            kpLength          |
+-+-+-+-+-+-+-+-+-+-+-+-+-+-+-+-+-+-+-+-+-+-+-+-+-+-+-+-+-+-+-+-+--
|                              kpSequence                                |
+-+-+-+-+-+-+-+-+-+-+-+-+-+-+-+-+-+-+-+-+-+-+-+-+-+-+-+-+-+-+-+-+--
| FRG |           x             |            kpHcSignal                 |
+-+-+-+-+-+-+-+-+-+-+-+-+-+-+-+-+-+-+-+-+-+-+-+-+-+-+-+-+-+-+-+-+--
|    kepVersion    |K|B|x|  kepBID   |                                  |
+-+-+-+-+-+-+-+-+-+-+-+-+-+-+-+-+-+-+                                   +
|                              kepDestAddress                            |
+-+-+-+-+-+-+-+-+-+-+-+-+-+-+-+-+-+-+-+-+-+-+-+-+-+-+-+-+-+-+-+-+--
|                              kepSrcAddress                             |
+-                                    -+-+-+-+-+-+-+-+-+-+-+-+-+-+-+-+--+
|                                  |              kepEthType             |
+-+-+-+-+-+-+-+-+-+-+-+-+-+-+-+-+-+-+-+-+-+-+-+-+-+-+-+-+-+-+-+-+--
| ipVer | ipIHL |   ipDSCP   |ECN|         ipTotalLength                |
+-+-+-+-+-+-+-+-+-+-+-+-+-+-+-+-+-+-+-+-+-+-+-+-+-+-+-+-+-+-+-+-+--
|        ipIdentification          |x|D|M|       ipFragmentOffset        |
+-+-+-+-+-+-+-+-+-+-+-+-+-+-+-+-+-+-+-+-+-+-+-+-+-+-+-+-+-+-+-+-+--
|     ipTTL       |   ipProtocol    |         ipHeaderChecksum           |
+-+-+-+-+-+-+-+-+-+-+-+-+-+-+-+-+-+-+-+-+-+-+-+-+-+-+-+-+-+-+-+-+--
|                            ipSourceAddress                             |
+-+-+-+-+-+-+-+-+-+-+-+-+-+-+-+-+-+-+-+-+-+-+-+-+-+-+-+-+-+-+-+-+--
|                          ipDestinationAddress                          |
+-+-+-+-+-+-+-+-+-+-+-+-+-+-+-+-+-+-+-+-+-+-+-+-+-+-+-+-+-+-+-+-+--
|         tcpSourcePort            |           tcpDestinationPort        |
+-+-+-+-+-+-+-+-+-+-+-+-+-+-+-+-+-+-+-+-+-+-+-+-+-+-+-+-+-+-+-+-+--
|                           tcpSequenceNumber                            |
+-+-+-+-+-+-+-+-+-+-+-+-+-+-+-+-+-+-+-+-+-+-+-+-+-+-+-+-+-+-+-+-+--
|                        tcpAcknowledgmentNumber                         |
+-+-+-+-+-+-+-+-+-+-+-+-+-+-+-+-+-+-+-+-+-+-+-+-+-+-+-+-+-+-+-+-+--
| tcpOfst |   x   |C|E|U|A|P|R|S|F|            tcpWindow                 |
+-+-+-+-+-+-+-+-+-+-+-+-+-+-+-+-+-+-+-+-+-+-+-+-+-+-+-+-+-+-+-+-+--
|         tcpChecksum              |          tcpUrgentPointer           |
+-+-+-+-+-+-+-+-+-+-+-+-+-+-+-+-+-+-+-+-+-+-+-+-+-+-+-+-+-+-+-+-+--
```

TABLE 2-continued

Header Fields for the TCP Category

| Field Name | Type | Additional Information |
|---|---|---|
| ipIdentification | ENCODED | Encoding: LSB modified (9 bits). |
| D (ip DF) | IMPLIED | |
| M (ip MF) | IMPLIED | |
| ipFragmentOffset | IMPLIED | |
| ipTTL | IMPLIED | |
| ipProtocol | IMPLIED | |
| ipHeaderChecksum | DERIVED | |
| ipSourceAddress | DEFINED | |
| ipDestinationAddress | DEFINED | |
| tcpSourcePort | DEFINED | |
| tcpDestinationPort | DEFINED | |
| tcpSequenceNumber | ENCODED | Encoding: LSB interval (18 bits). |
| tcpAcknowledgement Number | ENCODED | Encoding: LSB interval (18 bits). |
| tcpOfst | IMPLIED | |
| C (tcp CWR) | IMPLIED | |
| E (tcp ECE) | IMPLIED | |
| U (tcp URG) | IMPLIED | |
| A (tcp ACK) | IMPLIED | |
| P (tcp PSH) | CARRIED | |
| R (tcp RST) | IMPLIED | |
| S (tcp SYN) | IMPLIED | |
| F (tcp FIN) | IMPLIED | |
| tcpWindow | CARRIED | |
| tcpChecksum | CARRIED | Special: Validates the entire plaintext, uncompressed KP datagram. |
| tcpUrgentPointer | IMPLIED | |
| x | IMPLIED | The protocols do not define these fields. |

In the RTP category, the context data may contain one set of headers. These may represent either an incoming or an outgoing context. A two-way session such as for Voice Over Internet Protocol ("VoIP"), for example, may require two separate contexts.

The headers comprising the RTP context data may be KP, KEP, IP, UDP, and RTP. Note that the RTP header may have a variable length, as shown in the following table.

TABLE 3

Headers for RTP Category

```
 +-+-+-+-+-+-+-+-+-+-+-+-+-+-+-+-+-+-+-+-+-+-+-+-+-+-+-+-+-+-+-+-+
 |0|   kpVersion   |    kpType     |           kpLength            |
 +-+-+-+-+-+-+-+-+-+-+-+-+-+-+-+-+-+-+-+-+-+-+-+-+-+-+-+-+-+-+-+-+
 |                           kpSequence                            |
 +-+-+-+-+-+-+-+-+-+-+-+-+-+-+-+-+-+-+-+-+-+-+-+-+-+-+-+-+-+-+-+-+
 | FRG |            x           |           kpHcSignal             |
 +-+-+-+-+-+-+-+-+-+-+-+-+-+-+-+-+-+-+-+-+-+-+-+-+-+-+-+-+-+-+-+-+
 |   kepVersion  |K|B| x |  kepBID   |                             |
 +-+-+-+-+-+-+-+-+-+-+-+-+-+-+-+-+-+-+                             |
 |                           kepDestAddress                        |
 +-+-+-+-+-+-+-+-+-+-+-+-+-+-+-+-+-+-+-+-+-+-+-+-+-+-+-+-+-+-+-+-+
 |                           kepSrcAddress                         |
 +-                                 +-+-+-+-+-+-+-+-+-+-+-+-+-+-+-+
 |                               |              kepEthType         |
 +-+-+-+-+-+-+-+-+-+-+-+-+-+-+-+-+-+-+-+-+-+-+-+-+-+-+-+-+-+-+-+-+
 | ipVer | ipIHL |    ipDSCP    |ECN|         ipTotalLength        |
 +-+-+-+-+-+-+-+-+-+-+-+-+-+-+-+-+-+-+-+-+-+-+-+-+-+-+-+-+-+-+-+-+
 |          ipIdentification         |x|D|M|    ipFragmentOffset   |
 +-+-+-+-+-+-+-+-+-+-+-+-+-+-+-+-+-+-+-+-+-+-+-+-+-+-+-+-+-+-+-+-+
 |      ipTTL    |    ipProtocol     |       ipHeaderChecksum      |
 +-+-+-+-+-+-+-+-+-+-+-+-+-+-+-+-+-+-+-+-+-+-+-+-+-+-+-+-+-+-+-+-+
 |                          ipSourceAddress                        |
 +-+-+-+-+-+-+-+-+-+-+-+-+-+-+-+-+-+-+-+-+-+-+-+-+-+-+-+-+-+-+-+-+
 |                       ipDestinationAddress                      |
 +-+-+-+-+-+-+-+-+-+-+-+-+-+-+-+-+-+-+-+-+-+-+-+-+-+-+-+-+-+-+-+-+
 |          udpSourcePort            |        udpDestinationPort   |
 +-+-+-+-+-+-+-+-+-+-+-+-+-+-+-+-+-+-+-+-+-+-+-+-+-+-+-+-+-+-+-+-+
 |            udpLength              |           udpChecksum       |
 +-+-+-+-+-+-+-+-+-+-+-+-+-+-+-+-+-+-+-+-+-+-+-+-+-+-+-+-+-+-+-+-+
 | V |P|X|  rtpCC   |M|   rtpPT      |          rtpSequence        |
 +-+-+-+-+-+-+-+-+-+-+-+-+-+-+-+-+-+-+-+-+-+-+-+-+-+-+-+-+-+-+-+-+
 |                            rtpTimestamp                         |
 +-+-+-+-+-+-+-+-+-+-+-+-+-+-+-+-+-+-+-+-+-+-+-+-+-+-+-+-+-+-+-+-+
 |                              rtpSSRC                            |
 +-+-+-+-+-+-+-+-+-+-+-+-+-+-+-+-+-+-+-+-+-+-+-+-+-+-+-+-+-+-+-+-+
 |                                                                 |
 :                          rtpCSRCs (0-15)                        :
 |                                                                 |
 +-+-+-+-+-+-+-+-+-+-+-+-+-+-+-+-+-+-+-+-+-+-+-+-+-+-+-+-+-+-+-+-+
```

The following table may characterize the header fields for the RTP header compression category. Note that some header fields may have constraints. If any header field fails to meet its constraint then the datagram may be unsuitable for header compression.

TABLE 4

Header Fields for RTP Category

| Field Name | Type | Additional Information |
|---|---|---|
| kpVersion | IMPLIED | |
| kpType | IMPLIED | |
| kpLength | DERIVED | |
| kpSequence | ENCODED | Encoding: LSB modified (5 bits). |
| FRG (kp) | IMPLIED | |
| kpHcSignal | ignored | |
| kepVersion | IMPLIED | |
| K (kep) | IMPLIED | |
| B (kep) | IMPLIED | |
| kepBID | IMPLIED | |
| kepDestAddress | IMPLIED | |
| kepSrcAddress | IMPLIED | |
| kepEthType | IMPLIED | |
| ipVer | IMPLIED | |
| ipIHL | IMPLIED | |
| ipDSCP | IMPLIED | |
| ECN (ip) | IMPLIED | |
| ipTotalLength | DERIVED | |
| ipIdentification | ENCODED | Encoding: LSB modified (9 bits). |
| D (ip DF) | IMPLIED | |
| M (ip MF) | IMPLIED | |
| ipFragmentOffset | IMPLIED | |
| ipTTL | IMPLIED | |
| ipProtocol | IMPLIED | |
| ipHeaderChecksum | DERIVED | |
| ipSourceAddress | DEFINED | |
| ipDestinationAddress | DEFINED | |
| udpSourcePort | DEFINED | |
| udpDestinationPort | DEFINED | |
| udpLength | DERIVED | |
| udpChecksum | CARRIED | Special: Validates the entire plain-text, uncompressed KP datagram. |
| V (rtp) | IMPLIED | |
| P (rtp) | IMPLIED | |
| rtpCC | IMPLIED | Special: Determines number of CSRCs. |
| M (rtp) | CARRIED | |
| rtpPT | IMPLIED | |
| rtpSequence | ENCODED | Encoding: LSB interval (5 bits). |
| rtpTimestamp | ENCODED | Encoding: LSB interval (13 or 29 bits). |
| rtpSSRC | DEFINED | |
| rtpCSRCs | IMPLIED | Special: Variable number (0-15). |

The context data for the UDP category may contain one set of headers. These may be for either an incoming or an outgoing context. The headers for KP, KEP, IP, and UDP may make up the UDP context data. These appear in the table below.

TABLE 5

Headers for UDP Category

```
+-+-+-+-+-+-+-+-+-+-+-+-+-+-+-+-+-+-+-+-+-+-+-+-+-+-+-+-+-+-+-+--
|0|   kpVersion     |     kpType       |           kpLength      |
+-+-+-+-+-+-+-+-+-+-+-+-+-+-+-+-+-+-+-+-+-+-+-+-+-+-+-+-+-+-+-+--
|                              kpSequence                        |
+-+-+-+-+-+-+-+-+-+-+-+-+-+-+-+-+-+-+-+-+-+-+-+-+-+-+-+-+-+-+-+--
|FRG|            x              |              kpHcSignal        |
+-+-+-+-+-+-+-+-+-+-+-+-+-+-+-+-+-+-+-+-+-+-+-+-+-+-+-+-+-+-+-+--
|   kepVersion    |K|B|x|   kepBID   |                           |
+-+-+-+-+-+-+-+-+-+-+-+-+-+-+-+-+-+-+-                         -+
|                          kepDestAddress                        |
+-+-+-+-+-+-+-+-+-+-+-+-+-+-+-+-+-+-+-+-+-+-+-+-+-+-+-+-+-+-+-+--
|                          kepSrcAddress                         |
+-                        -+-+-+-+-+-+-+-+-+-+-+-+-+-+-+-+-+-+-+-+
|                           |              kepEthType            |
+-+-+-+-+-+-+-+-+-+-+-+-+-+-+-+-+-+-+-+-+-+-+-+-+-+-+-+-+-+-+-+--
| ipVer  |  ipIHL  |  ipDSCP  | ECN |         ipTotalLength      |
+-+-+-+-+-+-+-+-+-+-+-+-+-+-+-+-+-+-+-+-+-+-+-+-+-+-+-+-+-+-+-+--
|          ipIdentification           |x|D|M|   ipFragmentOffset |
+-+-+-+-+-+-+-+-+-+-+-+-+-+-+-+-+-+-+-+-+-+-+-+-+-+-+-+-+-+-+-+--
|      ipTTL      |   ipProtocol     |       ipHeaderChecksum    |
+-+-+-+-+-+-+-+-+-+-+-+-+-+-+-+-+-+-+-+-+-+-+-+-+-+-+-+-+-+-+-+--
|                         ipSourceAddress                        |
+-+-+-+-+-+-+-+-+-+-+-+-+-+-+-+-+-+-+-+-+-+-+-+-+-+-+-+-+-+-+-+--
|                       ipDestinationAddress                     |
+-+-+-+-+-+-+-+-+-+-+-+-+-+-+-+-+-+-+-+-+-+-+-+-+-+-+-+-+-+-+-+--
|        udpSourcePort            |        udpDestinationPort    |
+-+-+-+-+-+-+-+-+-+-+-+-+-+-+-+-+-+-+-+-+-+-+-+-+-+-+-+-+-+-+-+--
|          udpLength              |          udpChecksum         |
+-+-+-+-+-+-+-+-+-+-+-+-+-+-+-+-+-+-+-+-+-+-+-+-+-+-+-+-+-+-+-+--
```

The following table may characterize the header fields for the UDP header compression category. Note that some header fields may have constraints. If any header field fails to meet its constraint then the datagram may be unsuitable for header compression.

TABLE 6

Header Fields for UDP Category

| Field Name | Type | Additional Information |
|---|---|---|
| kpVersion | IMPLIED | |
| kpType | IMPLIED | |
| kpLength | DERIVED | |
| kpSequence | ENCODED | Encoding: LSB modified (5 bits). |
| FRG (kp) | IMPLIED | |
| kpHcSignal | ignored | Special: Stored in context data as zero. |
| kepVersion | IMPLIED | |
| K (kep) | IMPLIED | |
| B (kep) | IMPLIED | |
| kepBID | IMPLIED | |
| kepDestAddress | IMPLIED | |
| kepSrcAddress | IMPLIED | |
| kepEthType | IMPLIED | |
| ipVer | IMPLIED | |
| ipIHL | IMPLIED | |
| ipDSCP | IMPLIED | |
| ECN (ip) | IMPLIED | |
| ipTotalLength | DERIVED | |
| ipIdentification | ENCODED | Encoding: LSB modified (14 bits). |
| D (ip DF) | IMPLIED | |
| M (ip MF) | IMPLIED | |
| ipFragmentOffset | IMPLIED | |
| ipTTL | IMPLIED | |
| ipProtocol | IMPLIED | |
| ipHeaderChecksum | DERIVED | |
| ipSourceAddress | DEFINED | |
| ipDestinationAddress | DEFINED | |
| udpSourcePort | DEFINED | |
| udpDestinationPort | DEFINED | |
| udpLength | DERIVED | |
| udpChecksum | CARRIED | Special: Validates the entire plain-text, uncompressed KP datagram. |

A Header Compression bit with a value of one may indicate the presence of a KEP/HC datagram. This may be the most significant bit of the first byte in the KEP/KP header portion of a frame in some embodiments of the present invention. For a remote session, a frame according to an embodiment of the present invention may be one that is IP/UDP encapsulated and sent to UDP port.

The KEP/HC header may be in two parts. The sender may not encrypt the first part. This part may indicate its own format, identify a context (or otherwise specify the format of the second part), and may tell the receiving entity how to decrypt the remainder of the frame. The sender may encrypt the second part. Its format may depend on the category of the identified context.

The remainder of a KEP/HC datagram may contain portions of the original content of the headers that were compressed. The sender may encrypt this data together with the second part of the KEP/HC header.

Most encoded header fields may use the method of least significant bit ("LSB") interval encoding, or a modified form of it. The encoded value may be some number of the least-significant bits from the header field. Primarily, this method may work for fields with values that increase monotonically. However, to accommodate frames that may arrive out of order, it may limit its operation to an encoding interval.

The encoding interval may have two attributes, its width and its offset. The width may depend on the number of bits in the encoded field. Each header field using this encoding method may specify its own offset.

The encoder may take the appropriate number of least-significant bits from the header value. The decoder may determine the most-significant bits from its context data. The purpose of using an encoding interval may be to improve the decoder's inference about the most-significant bits in the event that the field's values are not strictly monotonic. For example, this may occur due to reordering of IP or retransmission of TCP datagrams.

A entity may encode a field only if the new value lies within the encoding interval of the prior value. If any field in any header fails this test then the entity may send the frame without compressing its headers. For an encoded field with W bits, an offset of 0, and a prior value P, the new value may be in the interval $[(P-O), (P-O)+(2^{W}-1)]$.

An entity may decode this type of field using the same interval. It may base the interval on the most recently received valid value for the field. It may choose the value from that interval that has the same least-significant bits as it received in the compressed header encoding.

With some small frames, compressing headers may reduce the number of bytes of encrypted data below the minimum required by the encryption process. To compensate for this, an entity may append extra bytes before encryption. The least-significant four bits of the last byte may specify the number of extra or padding bytes. It may also set a flag in the compressed header to indicate that this occurred.

An entity that receives a frame with compressed headers may expand those headers into their original form. It may derive the length fields in the expanded headers from the length of the received frame. After decryption, if it finds that the length adjustment flag is set, it may adjust those length field derivations. It may examine the last decrypted byte of data to determine by how many bytes it needs to reduce each derived length.

Every compressed header may begin with a known prefix. In some embodiments, such a header is three bits. These bits may include the header compression bit and two format bits, as shown in the table below.

TABLE 7

Common Prefix
Common Prefix of Compressed Header

```
+---+---+---+---+---+---+---+---+
| 1 |  hcFmt |       . . .
+---+---+---+---+---+---+---+---+
```

The format field may be common to all compressed headers. The hcFmt field may be a 2-field specifying the format of the unencrypted part of the header. It may have the values shown in the following table.

TABLE 8

Possible Values for Format Field

| hcFmt | Format of KEP/HC Header (Unencrypted Part) |
|---|---|
| $00_2$ | The total size of the unencrypted part of the header is 16 bits. It encodes the KP sequence number and specifies the context identifier. |
| $01_2$ | Reserved. |
| $10_2$ | Reserved. |
| $11_2$ | Reserved. |

Format $00_2$ the unencrypted part of a KEP/HC header is shown below.

TABLE 9

Unencrypted Compressed Header - Format $00_2$
Unencrypted Compressed Header - Format $00_2$

```
+---+---+---+---+---+---+---+---+---+---+---+---+---+---+---+---+
| 1 | 0   0 |      hcKpSeq      |              hcCID            |
+---+---+---+---+---+---+---+---+---+---+---+---+---+---+---+---+
```

The two fields in this unencrypted part of the compressed header may encode the KP sequence number and specify the context identifier. The hcKpSeq field may be a 5-bit field that encodes the KP sequence number. It may use a modified LSB interval encoding. The hcCID field may be an 8-bit field containing the context identifier.

The encoding for the KP sequence number may be somewhat different from the usual LSB interval method. The least-significant bit in the KP sequence number may always be the same for frames traveling in a particular direction. Therefore, this field may use bits [5.1] rather than bits [4.0] for its 5-bit encoding. Its offset may also take this bit-shift into account.

The encoder may not use the encoding interval to test whether to encode the KP sequence number. It may encode the 5-bit value.

An entity may maintain an expected KP sequence number for each context. The decoder may use that expected value rather than the most recently received valid value. This may make the encoding interval $[(E-16), (E-16)+(2^6-1)]$ for the KP sequence number, where E may be the expected value for decoding.

In the TCP category, the compressed headers may be KP, KEP, IP, and TCP. Header compression may not allow options in the IP header. It may work with TCP options but may not attempt to compress them; it may simply carry them as if they were part of the TCP payload.

The KEP/HC header for the TCP category may consist of 12 bytes, shown in the following table. Note that the fields in this header may have lengths that do not always align them to byte boundaries. This fixed length header may guarantee that there is zero overhead for remote communications. That means that the size of a frame with compressed headers, carried between two entities, may be the same size as the original frame carried on the network(s) to which those entities are attached to. The TCP category may use KEP/HC format $00_2$ for the first, unencrypted part of the header. The receiving entity may learn the format of the second part by finding that the identified context is associated with the TCP category.

The encrypted part of the compressed header for the TCP category may have the following fields. The hcL field may be a bit flag that indicates whether the length of the TCP datagram requires adjustment. A value of zero may mean that the length is correct. A value of one may mean this datagram contains extra bytes, appended to meet the minimum encryption requirement. The hcS field may be a bit flag that indicates whether to swap the bytes in the IP identification field. A value of zero may mean that the field is correct. A value of one may mean the encoder swapped the bytes before encoding. The hcIpId field may be a 9-bit field that encodes the IP identification field. It may use an LSB interval encoding with an offset of 128, modified by the hcS flag, above. The hcP field may be a bit flag that carries the TCP PSH flag. The hcTcpSeq field may be an 18-bit field that encodes the TCP sequence number. It may use an LSB interval encoding with an offset of 65536. The hcTcpAck field may be an 18-bit field that encodes the TCP acknowledgement number. It may use an LSB interval encoding with an offset of 65536. The hcTcpWnd field may be a 16-bit field that carries the TCP window field. The hcTcpSum field may be a 16-bit field that carries the TCP checksum field. However, the encoder may adjust the value to exclude the TCP pseudo-header and include the KP, KEP, and IP headers. This may allow the receiver to validate the entire reconstructed datagram after decryption and header expansion.

In the outgoing part of the context, certain embodiments of the present invention may compare successive IP identification fields. If the most-significant byte varies while the least-significant does not then it may swap those bytes before encoding. This may support some systems processors that do not correctly encode the IP identification in network byte-order.

The compressed headers in the RTP category may be KP, KEP, IP, UDP, and RTP. The IP header may not have options

TABLE 10

Compressed Header - TCP Category
Compressed Header - TCP Category

```
+---+---+---+---+---+---+---+---+---+---+---+---+---+---+---+---+
| 1 | 0   0 |      hcKpSeq      |              hcCID            |
+===+===+===+===+===+===+===+===+===+===+===+===+===+===+===+===+
| hcL | hcS |         hcIpId          | hcP |         +---+---+ >
+---+---+---+---+---+---+---+---+---+---+---+ - -  +---+---+
<                   hcTcpSeq                            |       >
+---+---+---+---+---+---+---+---+---+---+---+---+---+---+---+---+
<                             hcTcpAck                          |
+---+---+---+---+---+---+---+---+---+---+---+---+---+---+---+---+
|                             hcTcpWnd                          |
+---+---+---+---+---+---+---+---+---+---+---+---+---+---+---+---+
|                       hcTcpSum (adjusted)                     |
+---+---+---+---+---+---+---+---+---+---+---+---+---+---+---+---+
``` and the UDP checksum may be present. The RTP header may specify padding and header extensions. However, header compression may not affect padding and may not operate on RTP header extensions. It may simply carry these bytes as if they were part of the RTP payload.

In the RTP category, the KEP/HC header may have 8, 10, or 12 bytes, depending on the timestamp encoding. Note that some fields may not align to byte boundaries. There is a separate diagram, below, for each size of compressed header.

These compressed headers may achieve no worse than zero overhead for remote communications. Furthermore, in the best case of RTP timestamp encoding, it may reduce the size of the frame by as much as four bytes compared to the original datagram carried on the internal network.

The RTP category may use KEP/HC format $00_2$ for the first, unencrypted part of the header. The receiving entity may learn the format of the second part by finding that the identified context is associated with the RTP category, and by examining the timestamp encoding flags.

TABLE 11

Compressed Header - RTP Category (Scaled Timestamp)
Compressed Header - RTP Category (Scaled Timestamp)

```
+---+---+---+---+---+---+---+---+---+---+---+---+---+---+---+---+
| 1 | 0   0 |       hcKpSeq         |           hcCID           |
+===+===+===+===+===+===+===+===+===+===+===+===+===+===+===+===+
| hcL | hcS |         hcIpId        |          hcRtpSeq         |
+---+---+---+---+---+---+---+---+---+---+---+---+---+---+---+---+
|                       hcUdpSum (adjusted)                     |
+---+---+---+---+---+---+---+---+---+---+---+---+---+---+---+---+
| hcM | 0   0 |                    hcRtpTS                      |
+---+---+---+---+---+---+---+---+---+---+---+---+---+---+---+---+
```

TABLE 12

Compressed Header - RTP Category (Random Timestamp)
Compressed Header - RTP Category (Random Timestamp)

```
+---+---+---+---+---+---+---+---+---+---+---+---+---+---+---+---+
| 1 | 0   0 |       hcKpSeq         |           hcCID           |
+===+===+===+===+===+===+===+===+===+===+===+===+===+===+===+===+
| hcL | hcS |         hcIpId        |          hcRtpSeq         |
+---+---+---+---+---+---+---+---+---+---+---+---+---+---+---+---+
|                       hcUdpSum (adjusted)                     |
+---+---+---+---+---+---+---+---+---+---+---+---+---+---+---+---+
| hcM | 0   1 |                                                >
+---+---+---+ - - - - - - hcRtpTsRand - - - - - - - - - - - - - +
<                                                               |
+---+---+---+---+---+---+---+---+---+---+---+---+---+---+---+---+
```

TABLE 13

Compressed Header - RTP Category (Scaled TS w/Scaling Values)
Compressed Header - RTP Category (Scaled TS with Scaling Values)

```
+---+---+---+---+---+---+---+---+---+---+---+---+---+---+---+---+
| 1 | 0   0 |       hcKpSeq         |           hcCID           |
+===+===+===+===+===+===+===+===+===+===+===+===+===+===+===+===+
| hcL | hcS |         hcIpId        |          hcRtpSeq         |
+---+---+---+---+---+---+---+---+---+---+---+---+---+---+---+---+
|                       hcUdpSum (adjusted)                     |
+---+---+---+---+---+---+---+---+---+---+---+---+---+---+---+---+
| hcM | 1   0 |                    hcRtpTS                      |
+---+---+---+---+---+---+---+---+---+---+---+---+---+---+---+---+
|                          hcRtpTsDiv                           |
+---+---+---+---+---+---+---+---+---+---+---+---+---+---+---+---+
|                          hcRtpTsRem                           |
+---+---+---+---+---+---+---+---+---+---+---+---+---+---+---+---+
```

The encrypted part of the compressed header for the TCP category may have the following fields. The hcL field may be a bit flag that indicates whether the length of the frame requires adjustment. A value of zero may mean that the length is correct. A value of one may mean this datagram contains extra bytes, appended to meet the minimum encryption requirement. The hcS field may be a bit flag that indicates whether to swap the bytes in the IP identification field. A value of zero may mean that the field is correct. A value of one may mean the encoder swapped the bytes before encoding. The hcIpId field may be a 9-bit field that encodes the IP identification field. It may use an LSB interval encoding with an offset of 128, modified by the hcS flag, above. The hcRtpSeq field may be a 5-bit field that encodes the RTP sequence number. It may use LSB interval encoding with an offset of 8. The hcUdpSum field may be a 16-bit field that carries the UDP checksum field. However, the encoder may adjust the value to exclude the UDP pseudo-header and may include the KP, KEP, and IP headers. This may allow the receiver to validate the entire reconstructed datagram after decryption and header expansion. The hcM field may be a bit that carries the M flag from the RTP header. The hcRtpTS field may be a 13-bit field that encodes the result of dividing the RTP timestamp by the scaling divisor. It may use LSB interval encoding with an offset of 2048. The hcRtpTsRand field may be a 29-bit field that encodes the RTP timestamp directly. It may use LSB interval encoding with an offset of 134217728. The hcRtpTsDiv field may be a 16-bit field that carries the RTP timestamp scaling divisor. The hcRtpTsRem field may be a 16-bit field that carries the RTP timestamp scaling remainder.

An RTP context may begin as a trial context. The entity may monitor the sequence of frames to determine if they are suitable for RTP header compression. If so, it may convert that context to an actual RTP context.

Once a trial RTP context becomes an actual RTP context, header compression may begin in this category. At first, it may use the second form of the RTP compressed header to encode the timestamp field. However, it may also begin monitoring the differences between successive timestamps. It may determine the greatest common divisor ("GCD") of those differences.

If an entity finds that the timestamp GCD is greater than one, it may divide the next timestamp value by that divisor. This may determine the scaled timestamp value and its remainder. It then may send those three pieces of information in the third form of the RTP compressed header.

Subsequently, the RTP context may use the first form of the compressed header. It may calculate and encode the scaled timestamp value using the timestamp divisor previously sent to the other entity. However, when the actual timestamp value wraps around its 32-bit field, the entity may calculate a new divisor and remainder. It may send these again in the third form of the compressed header.

An entity may also compare successive IP identification fields for the need to swap bytes. This may be the same procedure described for the TCP category.

The UDP category may compress KP, KEP, IP, and UDP headers. This category may not be as efficient as the others in that its compressed header may not reduce the overhead to zero. It may not allow options in the IP header but may require a valid UDP checksum.

The KEP/HC header in the UDP category may consist of 6 bytes, as shown in the following table. Although not optimal, in remote communications, it may leave the frame 6 bytes larger than the original frame. Still, this is better than the 60 byte increase without compressed headers.

The UDP category may use KEP/HC format $00_2$ for the first, unencrypted part of the header. The receiving entity may learn the format of the second part by finding that the identified context is associated with the UDP category.

TABLE 14

Compressed Header - UDP Category
Compressed Header - UDP Category

```
+---+---+---+---+---+---+---+---+---+---+---+---+---+---+---+---+
| 1 | 0   0 |       hcKpSeq         |              hcCID         |
+===+===+===+===+===+===+===+===+===+===+===+===+===+===+===+===+
| hcL | hcS |                     hcIpId                         |
+---+---+---+---+---+---+---+---+---+---+---+---+---+---+---+---+
|                      hcUdpSum (adjusted)                       |
+---+---+---+---+---+---+---+---+---+---+---+---+---+---+---+---+
```

The encrypted part of the compressed header for the UDP category may have the following fields. The hcL field may be a bit flag that indicates whether the length of the datagram requires adjustment. A value of zero may mean that the length is correct. A value of one may mean this datagram contains extra bytes, appended to meet the minimum encryption requirement. The hcS field may be a bit flag that indicates whether to swap the bytes in the IP identification field. A value of zero may mean that the field is correct. A value of one may mean the encoder swapped the bytes before encoding. The hcIpId field may be a 14-bit field that encodes the IP identification field. It may use an LSB interval encoding with an offset of 128, modified by the hcS flag, above. The hcUdpSum field may be a 16-bit field that carries the UDP checksum field. However, the encoder may adjust the value to exclude the UDP pseudo-header and include the KP, KEP, and IP headers. This may allow the receiver to validate the entire reconstructed datagram after decryption and header expansion.

A UDP context may begin as a trial RTP context. If this does not meet the requirements for RTP header compression then it may convert to UDP. An entity may compare successive IP identification fields for the need to swap bytes. This may be the same procedure described for the TCP category.

Before compressing headers, the two entities in a KEP session may discover and establish a suitable context. Establishing a shared header compression context, however, may require the entities to signal each other according to the procedures described below.

One of the entities, the initiator, may discover a suitable context. It then may send an initiation signal to the other entity. That entity, the collaborator, may either accept or refuse header compression in that context. It may send a signal with its response.

Subsequently, the two entities may each maintain context data within an established context. This data may remain sufficiently equivalent for header compression to operate correctly. However, problems can arise that may cause the context data in the two entities to lose their equivalence. An entity may detect such problems while sending or receiving compressed headers. It may then send a signal to reestablish context data equivalence.

One type of problem may occur when an entity cannot properly encode a field into a compressed header. For example, if a substantial amount of time passes between sending frames in a particular context, but during that time several frames are sent in other contexts, it may not be possible to encode the change to the IP identification field. When this occurs, the entity may send the frame without compressing headers. It also may attach a signal to tell the receiving entity to update its context data. That signal may also request a response.

Another problem may occur when an incoming frame with compressed headers fails its validation check. Although this could be due to a transmission error, the receiving entity may assume that the failure is due to bad context data. It then may send a signal to the other entity to request an update. In a bidirectional context, it may attach that signal to the next outgoing frame in the context. In a unidirectional context, it may attach the signal to a special keep-alive frame.

Either entity may determine that a header compression context is no longer useful. It may then send a termination signal to the other entity. That entity may respond with an agreement to discard the context.

Because signals may be lost, an entity may need to repeat some signals. It may also be capable of recovering context allocations that remain unused for a significant period of time.

There may be three types of signals: those that accompany a context, those sent in special keep-alive frames, and those sent in special keep-alive frames with context information. Signals may travel in the KP header, so the frames carrying signals never have compressed headers.

Some signals may communicate context data from one entity to the other. For the most part, an entity may attach such a signal to a frame within the context in question. The receiving entity may extract context data from the frames uncompressed headers.

Some signals may not require any association with context data. For example, when discarding a context, the sending entity may have no knowledge of the context data, or even the context category. Moreover, in a unidirectional context, there may be no frames traveling in the necessary direction to which an entity can attach the signal. In these circumstances an entity may use a special keep-alive frame to carry the signal.

Finally, in a special case, an entity may send an INIT_OUT signal in a keep-alive frame whose encrypted contents also carry context data. This signal may initiate a unidirectional context where the signal must travel in the opposite direction from the context's normal frame, so there may be no frames with context data to which to attach the signal.

A receiving entity may normally ignore the encrypted content of a keep-alive frame. For an INIT_OUT signal, however, it may carry the necessary data for initiating the context. This data may be a copy of the most recently received set of uncompressed headers within the context. For example, in the RTP category, they may be the KP, KEP, IP, UDP, and RTP headers.

In a bidirectional context, both entities may maintain two sets of context data, for outgoing and incoming frames. The outgoing part of the context for one entity may correspond to the incoming part of the context for the other entity.

An initiator may monitor both incoming and outgoing frames to find a suitable bidirectional context. Initiation of a bidirectional context uses the following signals.

TABLE 15

Initiation of a Bidirectional Context
Initiation of a Bidirectional Context

| Initiator | Collaborator |
|---|---|
| INIT_IN<br>Attach this signal to every outgoing frame within the context until receiving a response. Also record the outgoing context data from each such frame. | |
| | Upon receiving an INIT_IN signal for a bidirectional context either accept or refuse it. If accepting, record incoming context data from the frame.<br>UPDATE<br>To accept the context, attach this signal to the next outgoing frame within the context after receiving each INIT_IN signal. Also record the outgoing context data from that frame. This establishes the context for the collaborator.<br>DISCARD<br>To refuse the context, attach this signal to a special keep-alive frame and send it immediately. |
| Upon receiving a DISCARD signal immediately eliminate the context.<br>Upon receiving an UPDATE signal record incoming context data from the frame. Also cease sending INIT_IN signals. This establishes the context for the initiator. | |

Once a context is established, an entity may begin compressing headers. In normal operation, each entity may compress headers in every outgoing frame within the context. They may also record outgoing context data from each such frame. Upon receiving a frame with compressed headers, the entities may attempt to reconstruct the original frame. If it passes the validity check, they may record incoming context data from the reconstructed frame.

However, an entity may occasionally have reason to doubt the correctness or efficacy of its context data. In these circumstances it may signal the other entity, using a frame with uncompressed headers.

One problem may be an inability to correctly encode a field into its compressed form. Either entity may encounter this problem, and send the following.

TABLE 16

Simple Bidirectional Context Data Update

| Entity with Problem | Other Entity |
|---|---|
| UPDATE<br>Attach this signal to the outgoing frame. Also record the outgoing context data from it. | |
| | Upon receiving an UPDATE signal record the incoming context data from the frame. |

In some cases, it may be better to request an exchange of context data rather than simply update the other entity's incoming context data. The occurrence of an outgoing TCP retry may be one example of this.

Another problem may be a failed validation check on a reconstructed frame. The receiving entity may assume that its context data are incorrect and request an exchange of context data. A context data exchange in a bidirectional context may use the following signals.

TABLE 17

Bidirectional Context Data Exchange

| Entity with Problem | Other Entity |
|---|---|
| EXCHANGE<br>Attach this signal to every outgoing frame within the context until a response. Also record the outgoing context data from each such frame. | |
| | Upon receiving an EXCHANGE signal record the incoming context data and respond.<br>UPDATE<br>To respond, attach this signal to The next outgoing frame within the context after receiving each EXCHANGE signal. Also record the outgoing context data from that frame. |
| Upon receiving an UPDATE signal record the incoming context data from the frame. Also cease sending EXCHANGE signals. | |

Either entity may determine that a header compression context is no longer useful. It may terminate that context. Once an entity decides to terminate a context it may cease sending compressed headers and continue the termination operation until the context is gone.

TABLE 18

Termination of a Bidirectional Context

| Terminating Entity | Other Entity |
|---|---|
| TERMINATE<br>Attach this signal to every outgoing frame within the context until a response. | |
| | Upon receiving a TERMINATE signal eliminate the context and respond. |

TABLE 18-continued

Termination of a Bidirectional Context

| Terminating Entity | Other Entity |
|---|---|
| | DISCARD<br>To respond, attach this signal to the next outgoing frame within the context or, if there is no more traffic within the context, to a special keep-alive frame. |
| Upon receiving a DISCARD signal immediately eliminate the context. | |

The initiator may maintain outgoing context data and the collaborator may maintain incoming context data for this unidirectional communication. An initiator may monitor outgoing frames to discover a suitable unidirectional context. The following signals may initiate an incoming unidirectional context in the collaborator.

TABLE 19

Initiation of a Collaborator's Incoming Unidirectional Context

| Initiator | Collaborator |
|---|---|
| INIT_IN<br>Attach this signal to every outgoing frame within the context until receiving a response. Also record the outgoing context data from each such frame. | |
| | Upon receiving an INIT_IN signal for a unidirectional context either accept or refuse it. If accepting, record incoming context data from the frame.<br>ACCEPT<br>To accept the context, attach this signal to a special keep-alive frame and send it immediately after receiving each INIT_IN signal. This establishes the context for the collaborator.<br>DISCARD<br>To refuse the context, attach this signal to a special keep-alive frame and send it immediately. |
| Upon receiving a DISCARD signal immediately eliminate the context.<br>Upon receiving an ACCEPT signal cease sending INIT_IN signals. This establishes the context for the initiator. | |

The initiator may begin compressing headers once it establishes the context. In normal operation, the initiator may compress headers in every outgoing frame within the context. It may also record outgoing context data from each such frame. Upon receiving a frame with compressed headers, the collaborator may attempt to reconstruct the original frame. If it passes the validity check then the collaborator may record incoming context data from the reconstructed frame.

However, either entity may occasionally have reason to doubt the correctness or efficacy of its context data. In these circumstances it may signal the other entity to reestablish their context data. An initiator may do the following to reestablish context data correctness.

TABLE 20

Initiator Reestablishes Collaborator's Incoming Context Data

| Initiator | Collaborator |
|---|---|
| EXCHANGE<br>Attach this signal to every outgoing frame within the context until the exchange is complete. | |
| | Upon receiving an EXCHANGE signal record the incoming context data from the frame and complete the exchange.<br>ACCEPT<br>To complete the exchange, attach this signal to a special keep-alive frame and send it immediately after receiving each EXCHANGE signal. |
| Upon receiving an ACCEPT signal cease sending EXCHANGE signals. | |

TABLE 21

Collaborator Reestablishes Its Own Incoming Context Data

| Initiator | Collaborator |
|---|---|
| | QUERY<br>Attach this signal to special keep-alive frames and |
| send them periodically until | |
| | receiving a response. |
| Upon receiving a QUERY signal update the collaborator's context data.<br>UPDATE<br>To update context data, attach this signal to the next outgoing frame within the context after receiving each QUERY signal. | |
| | Upon receiving an UPDATE signal cease sending QUERY signals. |

Either entity may determine that a header compression context is no longer useful. It may terminate that context. Once an entity decides to terminate a context it may continue the termination operation until the context is gone. An initiator may begin the termination operation as follows.

TABLE 22

Initiator Termination of an Outgoing Context

| Initiator | Collaborator |
|---|---|
| TERMINATE<br>Attach this signal to every outgoing frame within the context until receiving a response. | |
| | Upon receiving a TERMINATE signal eliminate the context and respond.<br>DISCARD<br>To respond, attach this signal to a special keep-alive frame and send it immediately. |
| Upon receiving a DISCARD signal immediately eliminate the context. | |

A collaborator may do the following to terminate a context.

TABLE 23

Collaborator Termination of an Incoming Context

| Initiator | Collaborator |
|---|---|
| | TERMINATE<br>Attach this signal to special keep-alive frames and send them periodically until receiving a response. |
| Upon receiving a TERMINATE signal eliminate the context and respond.<br>DISCARD<br>To respond, attach this signal to the next outgoing frame within the context or, if there is no more traffic within the context, to a special keep-alive frame. | |
| | Upon receiving a DISCARD signal immediately eliminate the context. |

Unidirectional contexts from collaborator to initiator may suppose incoming context data for the initiator and outgoing context data for the collaborator. An initiator may monitor incoming frames to discover a suitable unidirectional context. It speculatively may record incoming context data until it determines the status of the context. The following signals may initiate an outgoing unidirectional context in the collaborator.

TABLE 24

Initiation of a Collaborator's Outgoing Unidirectional Context

| Initiator | Collaborator |
|---|---|
| INIT_OUT<br>Attach this signal to special keep-alive frames and send them periodically until receiving a response. | |
| | Upon receiving an INIT_OUT signal for a unidirectional context either accept or refuse it.<br>EXCHANGE<br>To accept the context, attach this signal to every outgoing frame within the context until the exchange is complete.<br>DISCARD<br>To refuse the context, attach this signal to a special keep-alive datagram and send it immediately. |
| Upon receiving a DISCARD signal immediately eliminate the context.<br>Upon receiving an EXCHANGE signal record the incoming context data from the frame and complete the exchange. Also cease sending INIT_OUT signals. This establishes the context for the initiator.<br>ACCEPT<br>To complete the exchange, attach this signal to a special keep-alive frame and send it immediately after receiving each EXCHANGE signal. | |

TABLE 24-continued

Initiation of a Collaborator's Outgoing Unidirectional Context
Initiation of a Collaborator's Outgoing Unidirectional Context

| Initiator | Collaborator |
|---|---|
| | Upon receiving an ACCEPT signal cease sending EXCHANGE signals. This establishes the context for the collaborator. |

The collaborator may begin compressing headers once it establishes the context. In normal operation, the collaborator may compress headers in every outgoing frame within the context. It may also record outgoing context data from each such frame. Upon receiving a frame with compressed headers, the initiator may attempt to reconstruct the original frame. If it passes the validity check then the initiator may record incoming context data from the reconstructed datagram.

However, either entity may occasionally have reason to doubt the correctness or efficacy of its context data. In these circumstances it may signal the other entity to reestablish their context data. An initiator may do the following to reestablish context data correctness.

TABLE 25

Initiator Reestablishes Its Own Incoming Context Data
Initiator Reestablishes Its Own Incoming Context Data

| Initiator | Collaborator |
|---|---|
| QUERY<br>Attach this signal to special keep-alive frames and send them periodically until receiving a response. | |
| | Upon receiving a QUERY signal update the initiator's context data.<br>UPDATE<br>To update context data, attach this signal to the next outgoing frame within the context after receiving each QUERY signal. |
| Upon receiving an UPDATE signal cease sending QUERY signals. | |

A collaborator may reestablish context correctness with the following.

TABLE 26

Collaborator Reestablishes Initiators Incoming Context Data
Collaborator Reestablishes Initiator's Incoming Context Data

| Initiator | Collaborator |
|---|---|
| | EXCHANGE<br>Attach this signal to every outgoing frame within the context until the exchange is complete. |
| Upon receiving an EXCHANGE signal record the incoming context data from the frame and complete the exchange.<br>ACCEPT<br>To complete the exchange, attach this signal to a special keep-alive frame and send it immediately after receiving each EXCHANGE signal. | |

TABLE 26-continued

Collaborator Reestablishes Initiators Incoming Context Data
Collaborator Reestablishes Initiator's Incoming Context Data

| Initiator | Collaborator |
|---|---|
| | Upon receiving an ACCEPT signal cease sending EXCHANGE signals. |

Either entity may determine that a header compression context is no longer useful. It may terminate that context. Once an entity decides to terminate a context it may continue the termination operation until the context is gone. An initiator may do the following to terminate a context.

TABLE 27

Initiator Termination of an Incoming Context
Initiator Termination of an Incoming Context

| Initiator | Collaborator |
|---|---|
| TERMINATE<br>Attach this signal to special keep-alive frames and send them periodically until receiving a response. | |
| | Upon receiving a TERMINATE signal eliminate the context and respond.<br>DISCARD<br>To respond, attach this signal to the next outgoing frame within the context or, if there is no more traffic within the context, to a special keep-alive frame. |
| Upon receiving a DISCARD signal immediately eliminate the context. | |

A collaborator may begin the termination operation as follows. It may also cease sending datagrams with compressed headers.

TABLE 28

Collaborator Termination of an Outgoing Context
Collaborator Termination of an Outgoing Context

| Initiator | Collaborator |
|---|---|
| | TERMINATE<br>Attach this signal to every outgoing frame within the context until receiving a response. |
| Upon receiving a TERMINATE signal eliminate the context and respond.<br>DISCARD<br>To respond, attach this signal to a special keep-alive frame and send it immediately. | |
| | Upon receiving a DISCARD signal immediately eliminate the context. |

Many types of errors may occur to complicate context management. The link may lose frames with signals, TCP connections and RTP sessions may cease abruptly due to endpoint system problems, and so on. Every entity that performs header compression may be ready to recover the ensuing idle context data.

The entity that recovers idle context data may send a DISCARD signal to the other entity. This may allow the other entity to likewise eliminate the context, in case it has not completed its context data recovery.

It may be possible for an entity to send a frame involving a context that the other entity no longer has. This may occur if the other entity recovered the context but its DISCARD signal was lost. If an entity receives a frame with compressed headers for a nonexistent context then it may discard that frame. If it receives a signal for a nonexistent context then it may not process the signal, but it may forward the encapsulated frame as normal. In both cases it may also respond with a DISCARD signal for that context, except that it may not respond if it received a DISCARD signal for a missing context.

Finally, an entity may receive a signal for an existing context with the wrong category, or some other inconsistency. This may be another indication of a context recovered in one entity but persisting in the other due to a lost DISCARD signal. When this occurs, the receiving entity may eliminate the context and send a DISCARD signal for that context.

FIGS. 3-7 depict a method of the present invention of using header compression for decreasing the overall byte size of frames to be transmitted a network.

Figure 3:
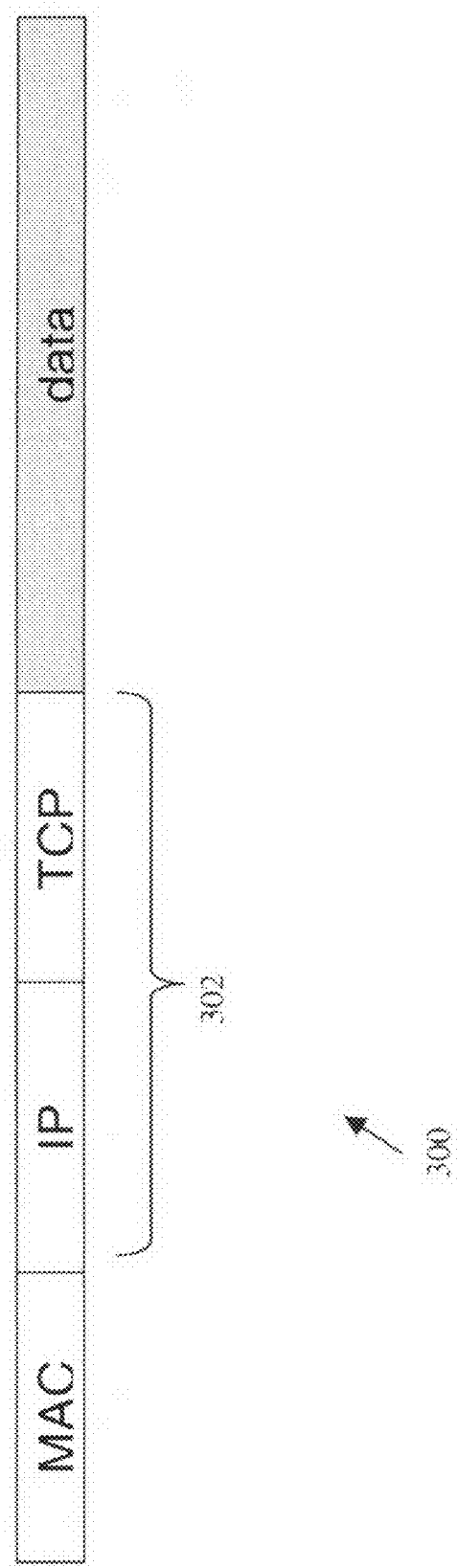
FIG. 3 is a schematic diagram depicting a first step in restructuring the original Ethernet frame to an Ethernet frame with header compression according to an embodiment of the present invention.

FIG. 3 is a schematic diagram depicting the first step in restructuring the original Ethernet frame of the prior art to an Ethernet frame that uses encryption techniques of the present invention with header compression according to an embodiment of the present invention. The header compression method of the present inventions may begin with the original frame 300 of the prior art. The first step may determine that the IP header/TCP header 302 of the original frame 300 may comprise data that does not change for a given service. Therefore, the sending entity may take the first instance of the IP header/TCP header 302 and create a service (context) record mapping.

Figure 4:
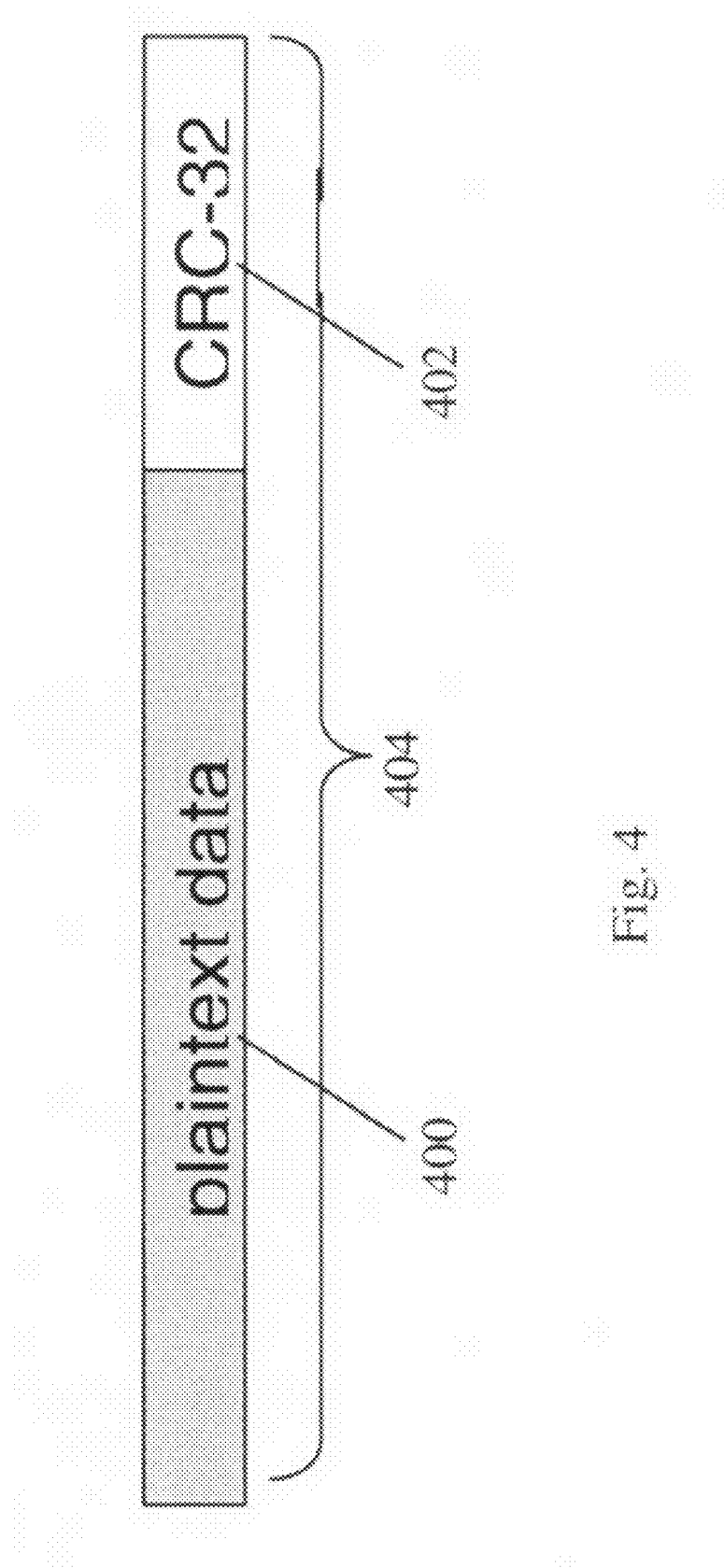
FIG. 4 is a schematic diagram depicting a second step in restructuring the original Ethernet frame to an Ethernet frame with header compression according to an embodiment of the present invention.

FIG. 4 is a schematic diagram depicting the second step in restructuring the original Ethernet frame of the prior to an Ethernet frame that uses encryption techniques with header compression according to an embodiment of the present invention. The second step may add a CRC-32 402 to the plain text data 400 of the original Ethernet frame. The second step may further encrypt the plaintext data and the CRC-32 404. Suitable encryption algorithms include, by way of non-limiting example, AES, 3DES and IDEA. Unlike the Ethernet frame of the present invention depicted in FIG. 2, the second step may not encrypt the IP/TCP with the plaintext data. Instead, the first step of FIG. 3 may store the IP/TCP in a service record mapping. The encrypted plaintext data and CRC-32 404 of the second step may comprise 4 bytes.

Figure 5:
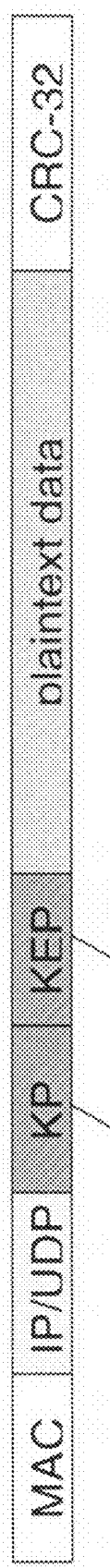
FIG. 5 is a schematic diagram depicting a third step in restructuring the original Ethernet frame to an Ethernet frame with header compression according to an embodiment of the present invention.

FIG. 5 is a schematic diagram depicting the third step in restructuring the original Ethernet frame of the prior to an Ethernet frame that uses encryption techniques of the present invention with header compression according to an embodiment of the present invention. According to one embodiment of the present invention, the KP header 502 may be configured to have header compression enabled. There may be two major changes in the KP header 502 from the header compression unenabled KP header 502 to the header compression enabled KP header 502. One change may allow a receiving entity to distinguish between a KP header 502 and a KEP/HC header. The other change may provide for signals to manage header compression context data. The following diagram shows the modified KP header.

TABLE 29

New KP Header

```
+-+-+-+-+-+-+-+-+-+-+-+-+-+-+-+-+-+-+-+-+-+-+-+-+-+-+-+-+-+-+-+-+
|0|   kpVersion    |     kpType    |            kpLength          |
+-+-+-+-+-+-+-+-+-+-+-+-+-+-+-+-+-+-+-+-+-+-+-+-+-+-+-+-+-+-+-+-+
|                            kpSequence                           |
+-+-+-+-+-+-+-+-+-+-+-+-+-+-+-+-+-+-+-+-+-+-+-+-+-+-+-+-+-+-+-+-+
| kpF |          x            |           kpHcSignal              |
+-+-+-+-+-+-+-+-+-+-+-+-+-+-+-+-+-+-+-+-+-+-+-+-+-+-+-+-+-+-+-+-+
```

Referring to Table 29, the most-significant bit of the first byte in KP portion of the frame may now be the compressed header bit. As shown above, this bit may be zero in a KP header 502. The other fields, may remain unchanged, except as noted below. The bits marked 'x' may be reserved. A transmitter may set them to zero and a receiver may ignore them.

The Version field may be a 7-bit field indicating the version of the protocol header. These are followed by the length, sequence and flag fields. The header compression signal ("kpHcSignal") field may be a 16-bit header compression signal field. If the kpHcSignal field has a value of zero there may be no header compression signal. The following diagram shows the subfields present when this field is non-zero.

TABLE 30

Header Compression Signal

```
+---+---+---+---+---+---+---+---+---+---+---+---+---+---+---+---+
|  hcCat  |   hcSig   |  x  |              hcCID                 |
+---+---+---+---+---+---+---+---+---+---+---+---+---+---+---+---+
```

Referring to Table 30, the bit marked 'x' may be reserved. It may be zero on transmission and may be ignored on reception. The field marked hcCat may be a 3-bit subfield stating the header compression category of the identified context. The following table may describe possible values of hcCat.

TABLE 31

Possible Values for hcCat Field

| hcCat | Name | Brief Description |
| --- | --- | --- |
| 0 | NON | No category; its only use is for discarding a context with an unknown category. |
| 1 | TCP | TCP connections; this context's definition is its source and destination IP addresses, and its source and destination TCP ports. |
| 2 | RTP | RTP sessions; this context's definition is its source and destination IP addresses, its source and destination UDP ports, and its RTP source ID. |
| 3 | UDP | UDP datagrams; this context's definition is its source and destination IP addresses, and its source and destination UDP ports. |
| 4-7 | | Currently undefined. |

The field marked hcSig may be a 4-bit subfield containing the signal for the identified context. The following table may describe possible values of hcSig. Note that the terms outgoing and incoming may be from the perspective of the entity receiving the signal.

TABLE 32

Possible Values for hcSig Field

| hcSig | Name | Brief Description |
| --- | --- | --- |
| 1 | INIT_OUT | Initiate an outgoing context. |
| 2 | INIT_IN | Initiate an incoming or bidirectional context. |
| 3 | ACCEPT | Establish an accepted outgoing context. |
| 4 | UPDATE | Update an incoming context (also used to establish the incoming part of an accepted bidirectional context). |
| 5 | EXCHANGE | Update an incoming context and request a response. For a bidirectional context, send an update signal. For a unidirectional context, send an accept signal. |
| 6 | QUERY | Request an update of an outgoing context. |
| 7 | TERMINATE | Terminate a context. |
| 8 | DISCARD | Immediately discard a context (also used to acknowledge termination and to refuse initiation of a context). |
| 9-15 | | Currently undefined. |

The field marked hcCID may be an 8-bit subfield that identifies the header compression context to which the signal applies. All contexts in a session may have unique identifiers. The context identifier may be in the range [0,255].

Referring again to FIG. 5, the third step may combine and remove all unchanging fields in the KP header 502 and the KEP header 504 and add that combination to the service record previously established in the first step of FIG. 3. Unchanging fields from the KP header 502 may comprise the version field, the type field, the flags field. The changing field from the KP header 502 may comprise the sequence field. The sequence field of the KP header 502 may comprise 4 bytes. Unchanging fields from the KEP header 504 may comprise the encVersion field, the flags field, the destination address field, the source address field and the Ethernet type field. With the exception of the sequence field, all KP header 502 fields may be added to the service (context) record. All KEP header 504 fields may be added to the service (context) record.

Figure 6:
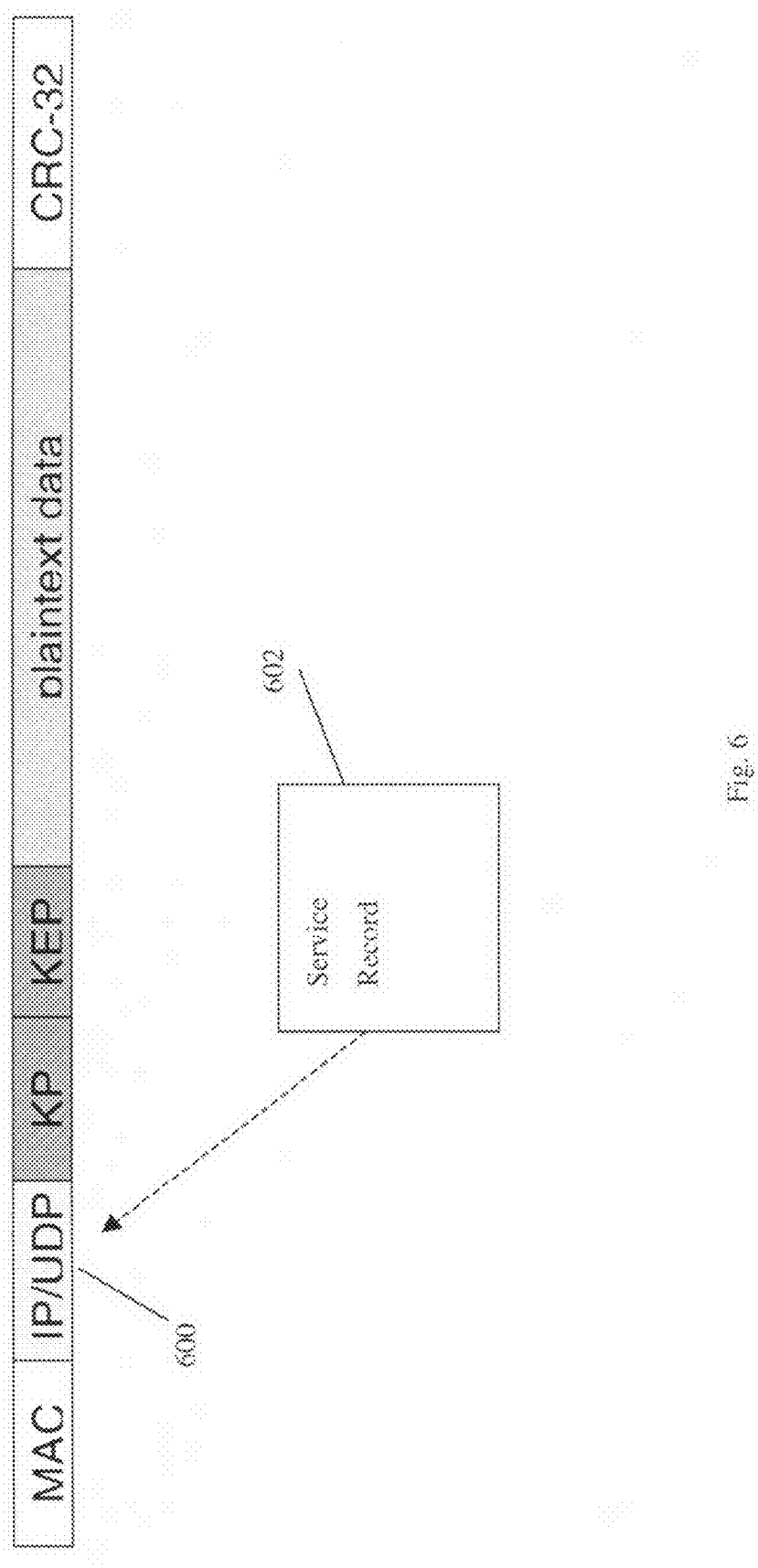
FIG. 6 is a schematic diagram depicting a fourth step in restructuring the original Ethernet frame to an Ethernet frame with header compression according to an embodiment of the present invention.

FIG. 6 is a schematic diagram depicting the fourth step in restructuring the original Ethernet frame of the prior art to an Ethernet frame that uses encryption techniques of the present invention with header compression according to an embodiment of the present invention. The service (context) record 602 may comprise a new format. The fourth step may register a service record 602 with a cooperating peer such as by way of non-limiting example, Koolspan lock technology. Registering a service record 602 with a lock may comprise sending a service record 602 to a lock that has been recorded in the source port field of the IP/UDP header 600. According to one embodiment, a service record 602 may be registered with a lock during initialization of the communication across the communications path. According to another embodiment, a service record 602 may be registered with a lock anytime prior to the termination of the communication across the communications path. The lock may hold the service record 602 containing all removed unchanging fields from the frame of FIG. 5 of the third step. The lock may reassemble future frames that contain a matching source port field in the IP/UDP header 600 by reinserting the appropriate fields into the frame from the service record 602 to reproduce the frame of FIG. 5.

Figure 7:
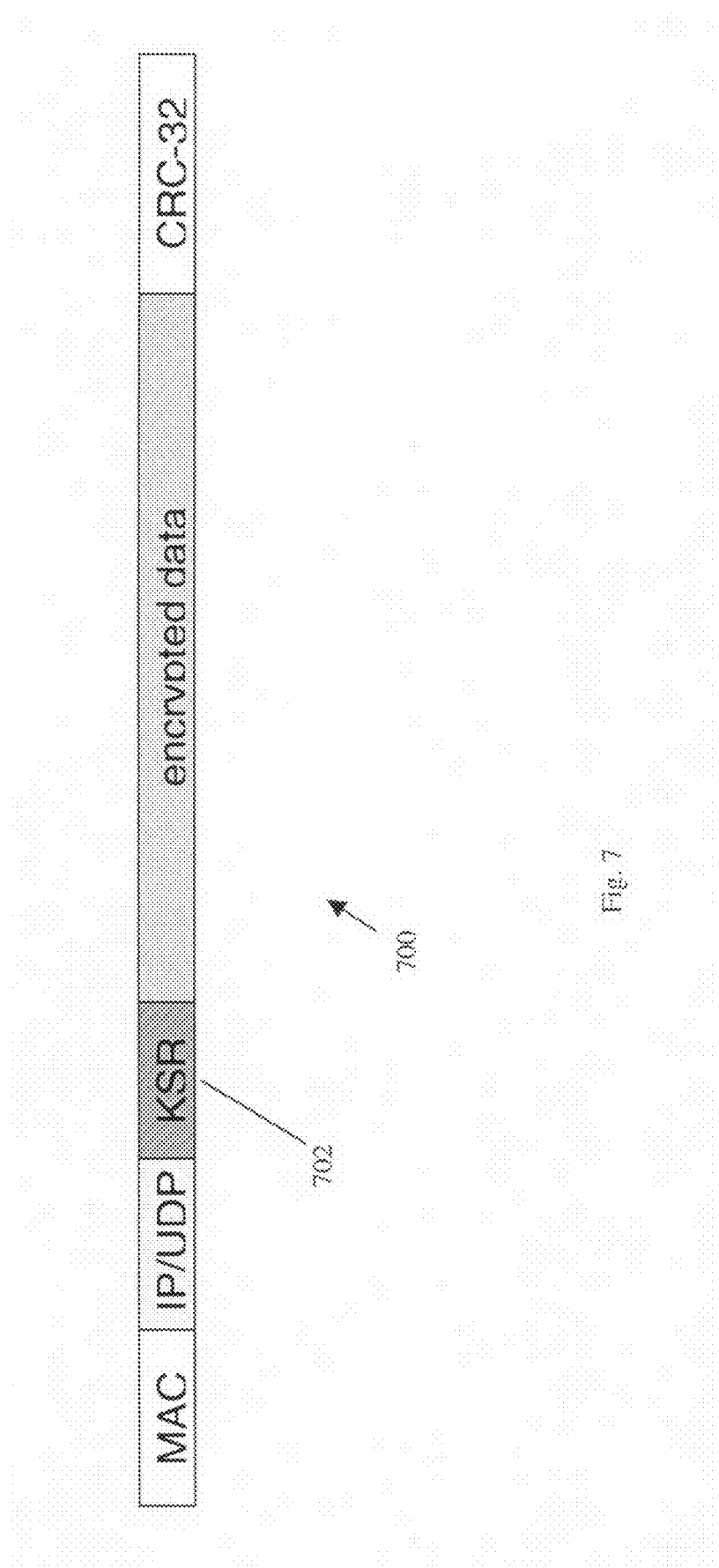
FIG. 7 is a schematic diagram depicting a final step in restructuring the original Ethernet frame to an Ethernet frame with header compression according to an embodiment of the present invention.

FIG. 7 is a schematic diagram depicting the fifth step in restructuring the original Ethernet frame of the prior art to an Ethernet frame that uses encryption techniques of the present invention with header compression according to an embodiment of the present invention. The fifth step may begin to transmit the restructured frame comprising the restructured Ethernet frame 700. The restructured frame may contain a KoolSpan Service Record ("KSR") header 702 comprising a sequence field of the KP header discussed above and a service record identifier. The KSR header 702 may comprise 6 bytes. As a result, the original frame of FIG. 3 may be restructured to comprise only 10 bytes of overhead, 6 bytes from the KSR header and 4 bytes from the encrypted data, while still using encryption techniques. With header compression, the overhead has been reduced from 60 bytes to 10 bytes. With the use of encryption and header compression of the present invention, a frame may be transmitted with the entire Ethernet frame within standard IP/UDP encapsulation without fragmentation.

Figure 8:
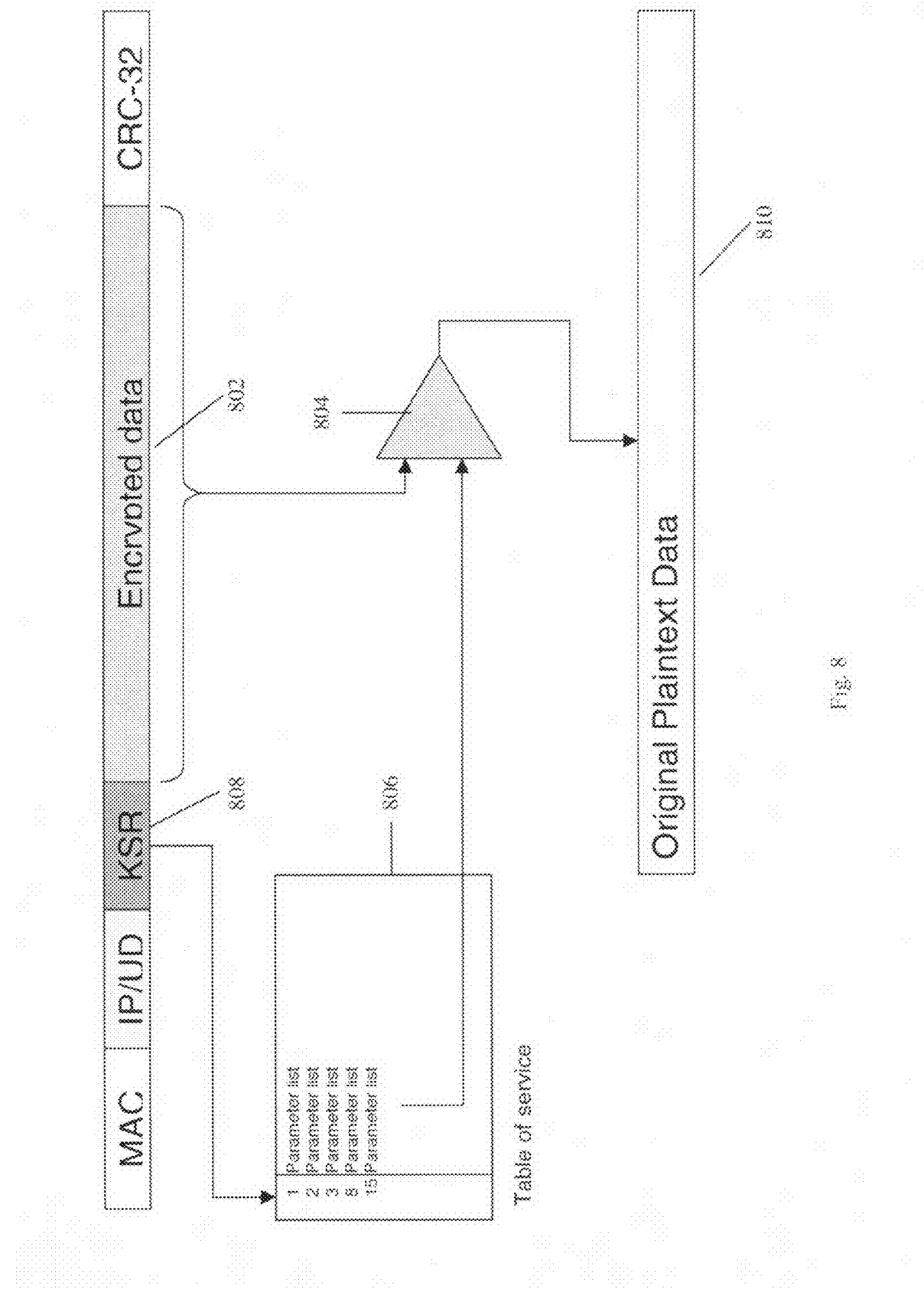
FIG. 8 is a schematic diagram depicting a lock functionality according to an embodiment of the present invention.

FIG. 8 is a schematic diagram depicting Koolspan lock functionality according to an embodiment of the present invention. The restructured frame may be transmitted comprising the restructured Ethernet frame 800 discussed above. Once the frame has reached the receiving entity, the original plaintext data 810 may be reassembled by the lock. Accordingly, the lock may capture the service record identifier from the KSR header 808. The lock may then reference the table of service records 806 comprising service records that were previously registered. The lock may then attempt to match the service record identifier with a registered service record. Upon finding a match, the lock may capture the parameter list associated with that service record identifier. The parameter list may comprise the previously removed unchanging fields of the KP header and KEP header. The lock may then capture the encrypted data 802 and combine the parameter list with the encrypted data 802 to reassemble 804 the original plaintext data 810.

Service records according to certain embodiments of the present invention represent communicated context data. Such context data is used to reconstitute headers from compressed headers on either side of the communications link. In association with such context data, the context field in headers altered according to certain embodiments of the present invention are used to identify communication flows. That is, such context fields are used to distinguish different communication flows so as to allow receivers to identify the correct context data, i.e., service records, to use for that particular information flow.

The term "packet" as used herein means data that includes a header and associated data payload. The term "header" does not necessarily require that the header appears first in any particular order. For example, a "packet" may include a header that is included within or that follows the data payload. Examples of packets include frames, fragments, datagrams, and other data units consistent with the OSI seven-layer model. Note, however, that "packets" as contemplated herein are not required to be conform to the OSI seven-layer model. In particular, although certain embodiments disclosed herein are described in reference to frames, the invention is not limited to Ethernet communication.

For the embodiments described herein, portions of one embodiment may be substituted, replaced, or inserted into other embodiments. That is, the teachings disclosed herein should be viewed collectively, with each embodiment capable of employing technologies drawn from other embodiments.

While the invention has been shown and described with reference to a particular embodiment thereof, it will be understood to those skilled in the art, that various changes in form and details may be made therein without departing from the spirit and scope of the invention.

What is claimed is:

1. A method of sending secure packets from a sender comprising programmed electronic processor to a receiver comprising programmed electronic processor over a computer network, the method comprising:

obtaining, by the sender, a first packet comprising a first header and a first data payload;

encrypting, by the sender, the first data payload to form a first encrypted data payload;

creating a first encryption header, the first encryption header comprising information derived from the first packet header, the first encryption header further comprising data regarding the first encrypted data payload;

creating, by the sender, a service record comprising data relating to the first encryption header;

associating the service record with a service record identification;

creating a first encrypted packet comprising the first encrypted data payload, the first encryption header, and the service record identification;

sending, from the sender to the receiver, the service record, the service record identification, and the first encrypted packet;

retaining, by the receiver, information from service record in association with the service record identification;

obtaining, by the sender, a second packet comprising second header and second data payload, the second packet consisting of a first number of bytes;

encrypting, by the sender, the second data payload to form second encrypted data payload;

creating a second encryption header, the second encryption header comprising information derived from the second packet header, the second encryption header further comprising data regarding the second encrypted data payload;

creating a second encrypted packet comprising the second encrypted data payload, the second encryption header, and the service record identification, the second encrypted packet consisting of a number of bytes equal to the first number of bytes;

sending, from the sender to the receiver, the second encrypted packet;

matching, by the receiver, the service record identification contained in the second encrypted packet with the information from the service record retained by the receiver;

recreating, by the receiver, the second packet header using at least one of the service record and information from the second encryption header; and decrypting the second encrypted payload using information from at least one of the service record and information from the second encryption header.

2. The method of claim 1 wherein the first number of bytes is 1,514.

* * * * *